United States Patent [19]

Herb

[11] 3,816,904

[45] June 18, 1974

[54] TOOL EXCHANGER DEVICE FOR A STAMPING MACHINE

[75] Inventor: Eugen Herb, Ditzingen, Germany

[73] Assignee: Triumph & Co., Stuttgart, Germany

[22] Filed: Aug. 25, 1971

[21] Appl. No.: 174,702

[30] Foreign Application Priority Data

Sept. 5, 1970 Germany............................ 2044183

[52] U.S. Cl...................... 29/568, 83/563, 83/701, 72/446
[51] Int. Cl............................................ B23q 3/155
[58] Field of Search........ 29/568; 83/563, 698, 701; 72/446

[56] References Cited
UNITED STATES PATENTS

| | | | |
|---|---|---|---|
| 3,234,648 | 2/1966 | Knowles............................... | 29/568 |
| 3,452,632 | 7/1969 | Brolund............................ | 83/698 X |
| 3,576,590 | 4/1971 | Fair et al. .......................... | 29/568 X |
| 3,628,231 | 12/1971 | Pancook............................. | 29/568 X |
| 3,638,523 | 2/1972 | Yasuda et al..................... | 83/698 X |

*Primary Examiner*—Andrew R. Juhasz
*Assistant Examiner*—Z. R. Bilinsky
*Attorney, Agent, or Firm*—McGlew and Tuttle

[57] ABSTRACT

A stamping machine includes a tool carrier having a receiving part, or tool carrier for a punch and for a bottom die. A cassette is provided for orienting the tool elements therein so that they may be moved into engagement with the tool carrier automatically. An automatically operable casette loading and loading device is located adjacent the tool carrier which and includes a rotatable support having a plurality of longitudinally extending distance members along which is movable a clamp or holder for a cassette carrying the tool elements. The distance members are shiftable for example, by rotation of disc plates which carry the members, so that they may be oriented downwardly in a position for receiving a cassette which has been selected from a magazine storage disc for the casetts by a selector transfer member and then shifted upwardly to a position in alignment with the tool carrier. The cassette receiver may be then shifted along the distance members to move the cassette with the tools into a position so that the tools may be easily deposited into the carrier after another one is first removed.

12 Claims, 19 Drawing Figures

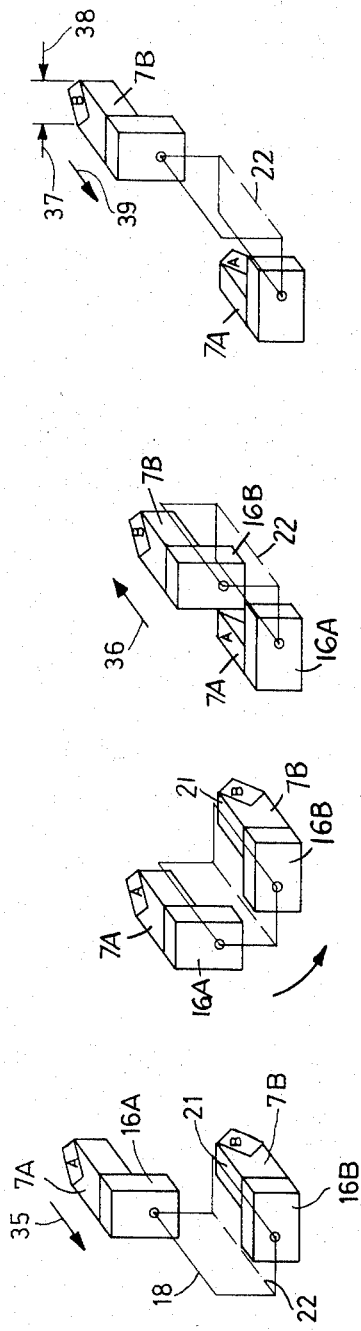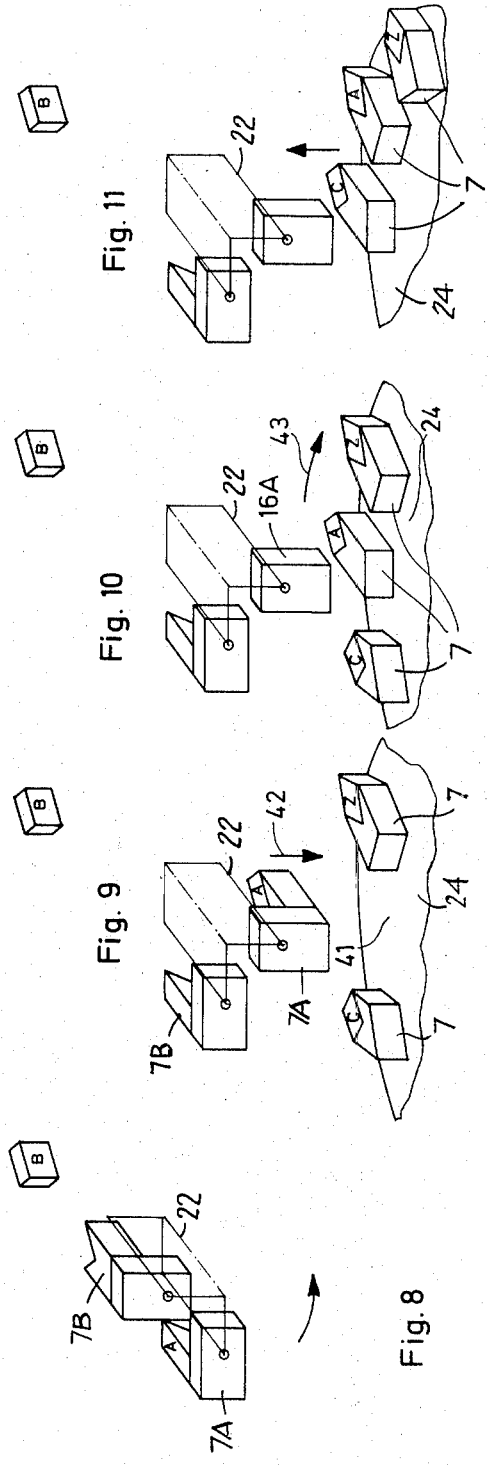

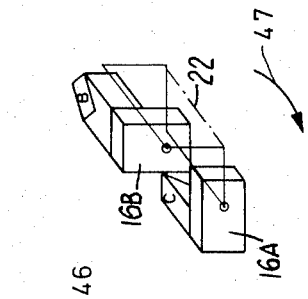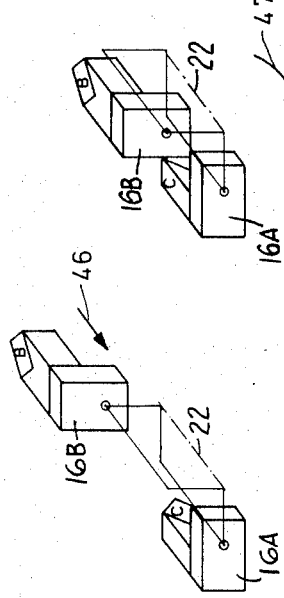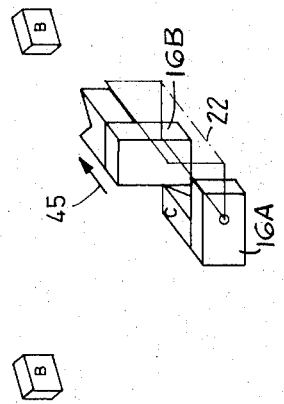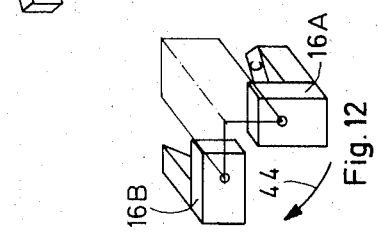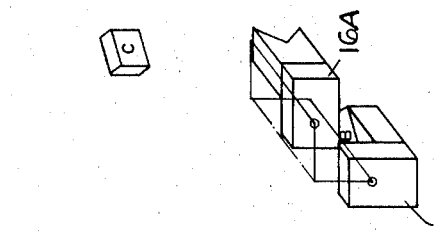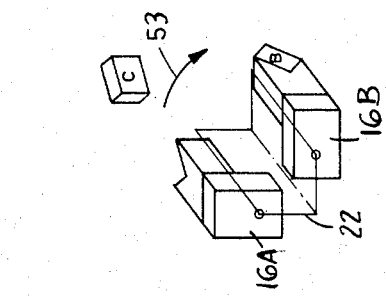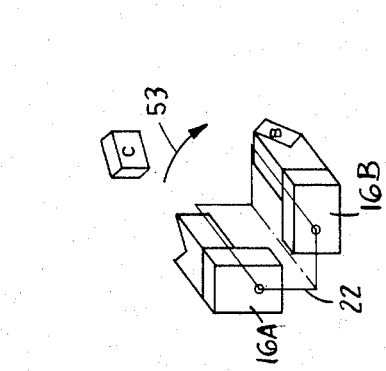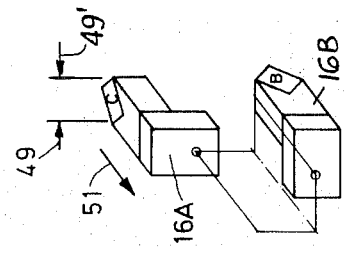

3,816,904

TOOL EXCHANGER DEVICE FOR A STAMPING MACHINE

BACKGROUND OF THE INVENTION

1. Field of the Invention

This invention relates in general to the construction of a stamping machine and, in particular to a new and useful device for the automatic exchange of tools for such machines.

2. Description of the Prior Art

The invention relates particularly to stamping machines which have tool carriers which operate with more than one tool parts. Stamping, nibbling machines and similar machines generally have more than one part which must cooperate together such as a punch and a bottom die. In addition, these two parts can be supplemented by a press pad and a stripper. Since these two cooperable parts are adapted very accurately in their dimensions to work together, they are always stored together when not in use. For this purpose, they are stored on a stand or similar device in order to avoid mixups and use of nonrelated parts which may result in damage or even destruction of the tool. In order to change the tools of a stamping or nibbling machine, the slide is always arranged in a certain position, chiefly its upper dead center position. After loosening the corresponding clamps or locks, the various parts of the tool are removed and replaced by others. The exchange of such tool sets have seen simplified by the use of holders which secure the tool parts in their proper orientation and which may be secured to a machine in a single operation.

SUMMARY OF THE INVENTION

The present invention is an improvement over the prior art primarily in the provision of means for automatically inserting and removing tool sets with the individual tool elements being arranged in the operational state prior to their insertion. For this purpose, a cassette or similar device is provided for receiving and properly orienting the tool parts. The invention provides an operating device which includes a magazine for storing a plurality of cassettes of different tools or tool sets in a location in which they may be easily engaged for selective removal and delivery to a tool carrier charging device or delivery device. The delivery device may advantageously be operated by an automatic program controlled setup for the changing of the tools in accordance with a pre-scheduled arrangement. When a tool set is used, the machine operates so that the tool parts including the slide and the punch return to an exactly determined raised position. Safety devices are employed to ensure that it does not leave this position during the changing of the tool parts. The lock for the tool parts can be loosened in this position so that they can be removed.

In one form of the invention the stamping machine includes a cassette storage for cooperative tool parts which includes a delivery mechanism for an empty cassette which is inserted by an automatic control when the operation is completed. It is then moved outwardly with the tool parts while an additional cassette is removed from a storage bin for movement into association with the tool carrier of the machine. The second cassette with the tool parts oriented in a proper orientation is introduced into the machine and the tool parts are transferred to the operative holders of the machine. This controlled operation for both types of movement may be effected for example by a control tape or band.

In the preferred embodiment of the invention, the inserting device for inserting the cassette with the tools comprises a hydraulic or pneumatically controlled fluid pressure piston and cylinder combination which provides the shifting movement of the member carrying the cassette. The fluid pressure is supplied from a pump or compressor which is actuated by a suitable control.

The cassette delivery mechanism advantageously comprises a rotatable support which carries a plurality of longitudinally extending distance pieces on which is movable clamping means for each cassette. The individual distance pieces may be oriented in a longitudinal alignment with the tool carrier and the cassette transferred to the carrier for pickup or deposit of a tool and movable in an opposite direction afterwards. The longitudinal movement is carried out by a displaceable member which is advantageously operated by fluid pressure. The tool delivery mechanism is then indexed or rotated to move the distance piece out of a position in which it is aligned with the tool carrier to one in which it is aligned with means for delivering the casette to a storage location when it is to be returned with the tools after use. The coupling and uncoupling of the cassette at the machine tool carrier is effected by a separate control device and the coupling may be effected for example magnetically. The device for moving each individual cassette is advantageously a controllable clamping device with clamping jaws which are movable relative to each other and which may be closed to engage a cassette and opened to deposit a cassette as necessary. The actuating means for the jaws may be magnetic, hydraulic or pneumatic, for example.

In a further development of the invention, one or more clamping devices can be coupled with the device for delivering and withdrawing the individual tools from the carrier. The individual clamping elements are carried on distance pieces which are movable out of the loading or unloading plane to a receiving or discharging plane for example by rotatable movement which is carried out by a program controlled device. The changing device includes two rotatable discs which support a plurality of distance pieces therebetween at circumferentially spaced locations. The device may operate to position one cassette in an orientation in which it can remove a previously operative tool set while another is in a position to pickup a new cassette containing another operative tool set. These positions may be reversed for the depositing of a tool backwardly into a cassette magazine with its associated cassette and to position the newly selected tool at the tool carrier. With such an arrangement, rotation is only necessary when a tool which has just been removed from the machine is to be moved out of the insertion range and another tool is to be brought into a coupling position with the tool carrier. The changing device can be locked in at least one second position with each clamping being correlated in this second position with an upper end position or transfer position of a transfer device which moves the individual cassettes out of a magazine storage.

The apparatus requires an operative movement of the clamping devices on their associated distance pieces to provide a correlation of a transfer device with the clamping means on the distance pieces. The transfer means is advantageously designed as an elevator which rises from beneath a rotary magazine table for the cassettes. The elevator moves below a selected cassette and lifts it off the rotatable table support and moves it upwardly into a position at which it can be engaged by clamping means on a distance piece. The lifting device will remain in the lifted position until it receives a cassette from the delivery mechanism and then it moves downwardly to place it in a specially provided location on the magazine. The transfer device can advantageously be driven or lifted by means of hydraulic or pneumatic pressure. The lowering can also be effected by utilizing gravity.

The rotary movement of the magazine table is advantageously such that it can be program controlled. In order to achieve an exact correlation of the magazine table with the transfer device, the table is turned intermittently in a very advantageous manner by means of an electric motor particularly a brake motor. If desirable or necessary, the vertically movable transfer device can be eliminated and the clamping elements of the delivery mechanism can be positioned so as to engage the cassettes directly from the magazine storage. An advantage of the rotatable supporting disc magazine is that it is very stable and very heavy and it carries a large number of cassettes with the associated tool parts. The number of cassettes may be as many as 15, 20 or even more, so that the total weight to be lifted is further increased. The transfer device does, however, avoid the necessary power and expense for lifting the large masses. In addition, the magazine can be arranged so that it can continue to turn during the ascending movement of a transfer device so that the supporting disc is exactly in the correct position when the transfer device arrives to remove or replace the tool. The magazine in the form of a rotary disc or table is provided with several radial slots which open at the edge and provide a support for the magazine around the circumference. The two lateral side edges of each slot form deposit areas for the cassettes between which the vertically movable transfer device may be moved. When it moves downwardly between the arms, it deposits the cassette between them, and when it moves upwardly, it moves the cassette upwardly out through the slot.

In accordance with a further feature of the invention, the delivery mechanism includes two distance pieces or sliding and guide bars for the movement of the carrier for the cassettes which are arranged at 90° radial spacing around the circumference of supporting disc plates which makes it easier for the removal of one tool and the replacement of another because the movement in one direction can be carried out on one of the holders while a movement in the other direction carried out by the other. The drives of the device for inserting and changing the tools as well as for the drive of the magazine are connected with the program control for the stamping machine and thus receive their commands for rotation or lifting and for the clamping and release of the magazines in dependence upon the stamping operation.

Accordingly, it is an object of the invention to provide an improved stamping machine having for delivering cooperative tool elements to the tool carrier automatically.

A further object of the invention is to provide a device for transferring cassettes having one or more cooperative tool parts into association with a tool carrier and for removing a previous tool carrier for storage.

A further object of the invention is to provide a device for automatically loading and unloading tool sets on stamping machines which are simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

FIGS. 4 through 19 are schematic perspective view of a cassette delivery mechanism showing the various stages of operation.

GENERAL DESCRIPTION OF THE PREFERRED EMBODIMENT

Figure 1:
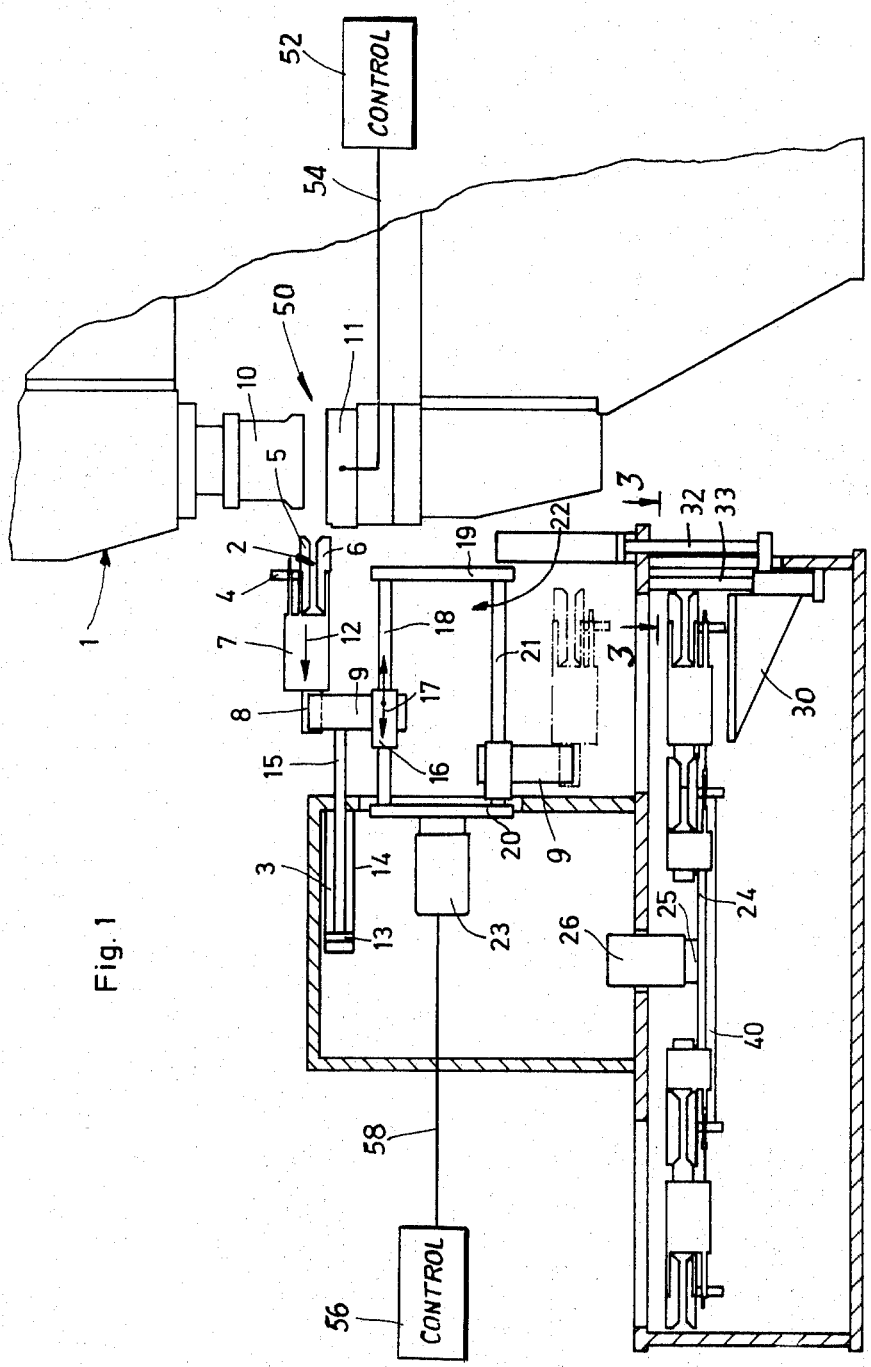
FIG. 1 is a partial side elevation and partial sectional view of a stamping machine constructed in accordance with the invention.

Referring to the drawing in particular, the invention embodied therein comprises, a stamping machine, generally designated 1, having a tool carrier, generally designated 50, which includes an upper tool carrier portion 10 and a lower tool carrying portion 11.

In accordance with the invention, means are provided for automatically delivering and withdrawing a set of cooperative tools for the stamping machine 1 comprising, in the embodiment illustrated, a punch 4, a stripper 5 and a bottom die 6, which are carried in a cassette or holder 7. The cassette 7 is shown with its rear end 8 being held by a clamping device or holder 9. The cassette 7 is moved to a transfer station to the right of the position indicated in FIG. 1 in which the cooperative tools, generally designated 2, are engaged with the tool carrier, generally designated 50. The punch 4 and the stripper 5 are held by the carrier 10 and the bottom die is held by the carrier part 11. The parts are locked either pneumatically or electromechanically into the tool carriers by a control means 52 which is schematically indicated as being connected to the tool carrier 50 by a connecting line 54. The tool holder 9 is advanced along a distance piece or quide and travel rod 18 by means of advancing means or pushing means 3 which comprises a double-acting piston and cylinder combination including a piston 13 which is slidable in a cylinder 14 and which carries a rod 15 connected to the holder 9. Depending upon whether the pressure is introduced into the cylinder 14 in front of or behind the piston 13, the holder 9 is moved either inwardly or outwardly. It is advanced toward the tool for the purpose of depositing the tool assembly in the carrier 50 or for the purpose of removing a previously loaded tool which must be changed, in which event it moves backwardly in the direction of the arrow 12 with the tool which is to be removed. The holder 9 is carried on a supporting device 16 which may be coupled with the free end of the piston 15 if desired. The device 16 is adapted to move with the holder 9 in either direction as indicated by the double arrows 17 along the distance piece 18. The distance piece 18 is part of a transfer or delivery mechanism, generally designated 22, which includes spaced discs 20 and 19 which carry a plurality of distance pieces 18, 21, etc., at spaced radial locations around the circumference of the associated discs 19 and 20. The discs are ratated by a driving motor 23 which is connected to the disc 20 and the rotation is in indexing fashion to present either the distance piece 18 of the distance piece 21 in a position in which the holder 9 aligns the cassette 7 either with the carrier 50 or with a vertically movable transfer device, generally designated 30, as is the case with the distance piece 21. The motor 23 is advantageously designed as a brake motor which is operated by a control 56 which is connected thereto through a connecting line 58. The two controls 56 and 58 are connected or formed as a part of the same control for the control of the movement of the machine so that the retraction and extension of the cassette 7, as well as the progress of the automatic tool change, may be carried out at the desired times.

As shown more clearly in schematic views indicated in FIGS. 4 to 19, two distance bars 18 and 21 are advantageously staggered so that their axes are on radial lines which are at 90° apart in respect to the associated discs 19 and 20. The FIG. 1 showing of the bar 21 would appear to be a 180° spacing, and this has been done for clarity of illustration purposes only, but the radial line spacing of the axes is in fact 90°.

Figure 2:
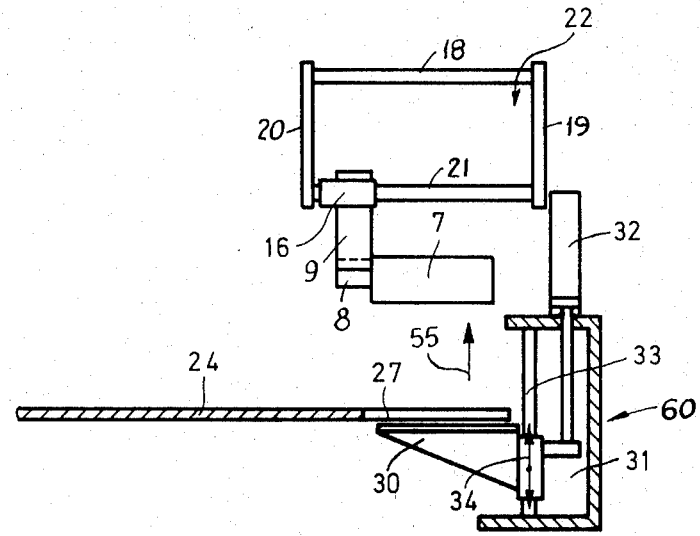
FIG. 2 is an enlarged partial sectional view of the magazine transfer apparatus shown in FIG. 1.
Figure 3:
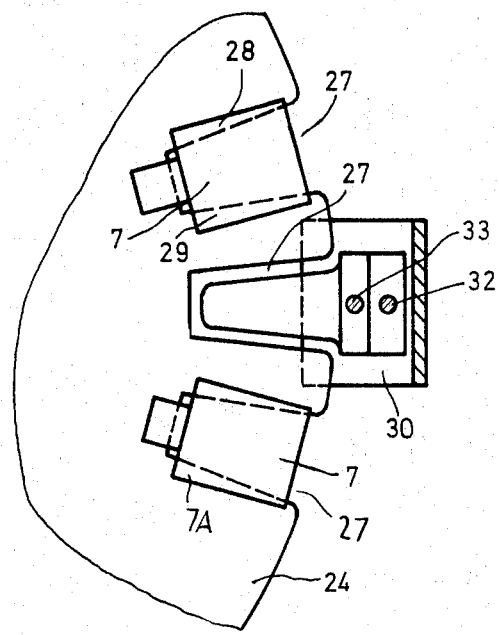
FIG. 3 is an enlarged partial sectional view taken along the line 3—3 of FIG. 1.

In accordance with a further feature of the invention, the delivery mechanism 22 is located above a housing 58 in which is rotatably supported a magazine wheel or disc 24 for rotation about a vertical shaft axis 25 by a driving brake motor 26. The magazine disc 24 includes a plurality of circumferentially spaced radially extending slots 27 as shown in FIGS. 2 and 3 which open to the outer circumference or edge. These slots mark deposit areas for the cassette 7. As a rule each cassette 7 carries a different tool and they are made with top cover portions 7 A which are wider than the slots 27 so that they rest on marginal areas 28 and 29 which constitute substantially radially extending support arms.

As best can be seen from FIGS. 2 and 3, the transfer mechanism, generally designated 60, includes an outwardly extending entrainer arm 30 which moves in a vertical direction through the slots 27 of the magazine table 24 after the table has been rotated by its motor 26 to position a selected cassette 7 in a position for transfer to the delivery mechanism 22. A fluid pressure operated piston and cylinder combination 32 is connected to the entrainer arm 30 and it is capable of moving it either upwardly or downwardly along a guide member 33, as shown by the double arrow 34. The holders 9 are designed as clamping elements and they are moved with the support 16 along the bar 21 to position the holder 9 adjacent the disc 20 in a position in which it overlies the rear end 8 of the cassette 7 so that it may clampingly engage this end. The upward movement of the entrainer arm 30 is as indicated by the arrow 55. After the holder 9 engages the cassette 7, it may move along its associated distance piece 21 in a direction toward the tool carrier 50 in order to position the cassette so that the tool assembly 2 is inserted into the carrier 50. The removal of the previously inserted tool is carried out in the reverse direction.

The various stages of operation of the deliver mechanism are set forth schematically in FIGS. 4 to 19 and the operation is as follows:

A tool A is in the cassette 7A of stamping machine 1 and it is to be replaced by a tool B in a cassette 7B. The supporting and holding means is designated 16A and it engages with a cassette 7A and it is moved to a position which corresponds to the extended position of the inserting device 3. In order to release the tool A, the clamping mechanism of the machine must be loosened or automatically be released such as by actuation of a control 52. The distance piece 21 already carries holding means designated 16B for the cassette 7B which carries a replacement tool B. After the cassette 7A takes over the removed tool A, it is moved by its supporting device 16A in the direction of the arrow 35 hence out of range of the tool carriers 10 and 11. The position now reached by the tools A & B is shown in FIG. 5.

The changing device is then moved counterclockwise by 90° until the position indicated in FIG. 6 is reached. The supporting device 16B for the tool B is displaced in the direction of the arrow 36 toward the stamping machine. The end position is indicated in FIG. 7 and the two arrows 37 and 38 schematically indicate the take-over and locking of the tool B in the stamping machine 1. The arrow 39 indicates the return movement of the empty cassette 7B.

The position of the changing device 22 shown in FIG. 8 is reached in which the tool B is located in the stamping machine and a further counterclockwise rotation by 90° orients the parts as shown in FIG. 9 in a position in which the cassette with the removed tool A may be placed on the magazine table 24 in the gap or slot 41 allotted to it at a location between to tool C and the tool Z. Another tool B may be placed between the tools A and Z. It should be appreciated that FIGS. 9 to 11 are only schematic showings of the magazine table 24 and the changing device 22 are illustrated just to give an approximate idea of the manner in which the magazines are stored. Naturally, they can also be arranged irregularly on the supporting disc 24 if desired. It is preferable, however, that the supporting disc 24 be mounted so that it is only necessary to rotate it in order to provide the selected positioning of the magazine over the transferred mechanism 30.

The tool A is taken from the position shown in FIG. 9, by the entrainer arm 30 (FIG. 2) when it is first raised to its end position to bring the tool A downwardly in the direction of the arrow 42 and deposit it on the supporting disc 24 of the magazine. The position represented in FIG. 10 is reached at this time. The supporting disc 24 turns in the direction of the arrow 43 until the tool C is in a transfer position in respect to entrainer arm 30. The entrainer arm 30 then moves upwardly to move the newly selected tool C into engagement with the supporting device 16 which is arranged there. In the meantime, or subsequently, the magazine supporting disc 24 can turn back against the direction of the arrow 43 so that the gap between the tools A and Z into which the tool B is to be placed is already in a correct position in respect to the transfer device 30.

As shown in FIG. 12, after the clamping device 9 of the supporting device 16A has taken over the tool C, it is moved by the delivery mechanism 22 in the direction of the arrow 44 or clockwise. This brings it into the changed position indicated in FIG. 13. In this location, the pushing device 3 pushes the supporting device 16B in a direction of the arrow 45 to engage the previous tool B in the machine 1. The engagement takes place after the tool B has been unlocked from the tool carriers 10 and 11 and it is then moved in the direction of the arrow 46, as shown in FIG. 14.

As shown in FIG. 15, the delivery device 22 is then rotated clockwise in the direction of the arrow 47 to position the tool C on its support 16A in an upward position in alignment with the tool carrier. The inserting device 3 is then operated to move the supporting device 16A to the stamping machine 1. The direction of movement is indicated by the arrow 48. The tool C is transferred to the holder, genrally designated 50, and the locking takes place. This is indicated by the arrows 49 and 49'. The inserting device 3 then closes supporting device 16A back into its starting position and there is a movement in the direction of the arrow 51.

From the position indicated in FIG. 18, the delivery mechanism is rotated in the direction of the arrow 53 to bring the parts to the position indicated in FIG. 19 in which position the tool B with the associated cassette is transferred by the entrainer arm 30 downwardly into a respective slot on the magazine table 24. The entrainer arm 30 then moves downwardly to deposit the magazine 17 with the tool B on the supporting disc 24. All of the other tools on the magazine table 24 may be changed in a similar manner.

While a specific embodiment of the invention has been shown and described in detail to illustrate the application of the principles of the invention, it will be understood that the invention may be embodied otherwise without departing from such principles.

What is claimed is:

1. A stamping machine having a tool carrier for holding a plurality of cooperable tools in an operative association, comprising a cassette having means for holding the cooperative tools in an orientation for positioning in the tool carrier, a changing device comprising a support having at least two distance members extending in longitudinal directions toward and away from the tool carrier, a cassette engagement member engageable with said cassette and being movable backwardly and forwardly along each said distance member, and an inserting device associated with said cassette engagement member for moving said engagement member toward the tool carrier for positioning the tools of said cassette thereon and for removing previously engaged tools therefrom and for moving said engagement member away from said carrier to remove said cassette, a storage magazine for said cassettes, and transfer means for transferring a tool cassette to each engagement member, said distance members having axes arranged at spaced circumferential locations on said support at an angle of 90°.

2. A stamping machine, according to claim 1, wherein said inserting device includes fluid pressure operated drive means, said cassette engagement member comprises a clamp movable along said distance member, said inserting device comprises a fluid pressure operated piston connected to said engagement member.

3. A stamping machine having a tool carrier for holding a plurality of cooperable tools in an operative association, comprising a cassette having means for holding the cooperative tools in an orientation for positioning in the tool carrier, a changing device comprising a support having at least two distance members extending in longitudinal directions toward and away from the tool carrier, a cassette engagement member engageable with said cassette and being movable backwardly and forwardly along each said distance member, and an inserting device associated with said cassette engagement member for moving said engagement member toward the tool carrier for positioning the tools of said cassette thereon and for removing previously engaged tools therefrom and for moving said engagement member away from said carrier to remove said cassette, a storage magazine for said cassettes, transfer means for transferring a tool cassette to each engagement member, each said distance member being supported and extending between two disc members, said disc members being rotatably supported, said distance members comprising slide bars and said engagement member being slidably movable therealong.

4. A stamping machine, according to claim 3, including an electric motor connected to said disc members to rotate said disc members in time relationship to the operation of the stamping machine.

5. A stamping machine, according to claim 3, said storage magazine for cassettes carrying the tool sets being located below said disc members, said disc members being rotatable with said distance members to position the distance members directly above said magazine, and said transfer means including mechanism for moving each cassette selectively from said disc members to a holding engagement member carried by a distance member which is oriented above said magazine.

6. A stamping machine, according to claim 5, wherein said transfer means comprises a vertically movable member, said magazine comprises a wheel having radially extending slots arranged around the circumference defining cassette receiving slots, the cassettes being adapted to be positioned in each of the slots, said vertically movable member being movable upwardly through a slot which is oriented thereover to move the cassette off the magazine and position it for engagement by an engagement member on one of said distance members.

7. A stamping machine, according to claim 6, including fluid pressure operated means connected to said vertically movable member for moving said member.

8. A stamping machine, according to claim 10, wherein said magazine comprises a wheel rotatable about a vertical axis and a motor connected to said wheel for driving said wheel in a program controllable manner.

9. A stamping machine, according to claim 1, including a rotatable magazine, means for rotating said magazine to position cassettes carried thereby in selective positions for withdrawal, a withdrawing device engageable with the magazine at a selected position for moving them into association with said changing device and an insert member associated with said changing device for moving an engagement member along said distance member toward the tool carrier.

10. A stamping machine having a tool carrier for holding a plurality of cooperable tools in an operative association, comprising a cassette having means for holding the cooperative tools in an orientation for positioning in the tool carrier, a changing device comprising a rotatable support having at least two distance members extending in longitudinal directions toward and away from the tool carrier, a cassette engagement member engageable with said cassette and being movable backwardly and forwardly along each said distance member, and an inserting device associated with said cassette engagement member for moving said engagement member toward the tool carrier for positioning the tools of said cassette thereon and for removing previously engaged tools therefrom and for moving said engagement member away from said carrier to remove said cassette, a storage magazine for said cassettes, and transfer means for transferring a tool cassette to each engagement member.

11. A stamping machine, according to claim 10, wherein said magazine for cassettes has a plurality of radially extending circumferentially spaced slots of a size to receive the individual cassettes, and said transfer means located adjacent said magazine includes a vertically movable member movable through a path extending through a slot of the magazine when the magazine is oriented with a selected slot thereover to engage and remove a casette therefrom and lift it upwardly.

12. A stamping machine having a tool carrier for holding a plurality of cooperable tools in an operative association, comprising a cassette having means for holding the cooperative tools in an orientation for positioning in the tool carrier, a changing device comprising a support having at least two distance members extending in longitudinal directions toward and away from the tool carrier, a cassette engagement member engageable with said cassette and being movable backwardly and forwardly along each said distance member, and an inserting device associated with said cassette engagement member for moving said engagement member toward the tool carrier for positioning the tools of said cassette thereon and for removing previously engaged tools therefrom and for moving said engagement member away from said carrier to remove said cassette, a storage magazine for said cassettes, and transfer means for transferring a tool cassette to each engagement member, said changing device including a rotatable support disc carrying a plurality of said distance members at circumferentially spaced locations, and an electric motor connected to said disc for rotation of said disc intermittently.

* * * * *

UNITED STATES PATENT OFFICE
CERTIFICATE OF CORRECTION

Patent No. 3,816,904          Dated  June 18, 1974

Inventor(s) Eugen Herb

It is certified that error appears in the above-identified patent and that said Letters Patent are hereby corrected as shown below:

The assignee's name is Firma Trumpf & Co.

Signed and sealed this 11th day of February 1975.

(SEAL)
Attest:

RUTH C. MASON
Attesting Officer

C. MARSHALL DANN
Commissioner of Patents
and Trademarks